(12) United States Patent
Gray et al.

(10) Patent No.: US 8,450,985 B2
(45) Date of Patent: May 28, 2013

(54) ENERGY RECOVERY CIRCUIT

(75) Inventors: Alexander Gray, Champaign, IL (US);
Patrick L. Chapman, Urbana, IL (US)

(73) Assignee: SolarBridge Technologies, Inc., Austin, TX (US)

( * ) Notice: Subject to any disclaimer, the term of this patent is extended or adjusted under 35 U.S.C. 154(b) by 795 days.

(21) Appl. No.: 12/560,975

(22) Filed: Sep. 16, 2009

(65) Prior Publication Data

US 2011/0062935 A1     Mar. 17, 2011

(51) Int. Cl.
*G05F 1/00*     (2006.01)

(52) U.S. Cl.
USPC ........................................................ 323/268

(58) Field of Classification Search
USPC .......... 323/234, 265.268, 222–224, 282–284; 363/16, 178
See application file for complete search history.

(56) References Cited

U.S. PATENT DOCUMENTS

| | | | | |
|---|---|---|---|---|
| 5,986,904 | A * | 11/1999 | Jacobs et al. | 363/53 |
| 6,495,993 | B2 * | 12/2002 | Eagar | 323/271 |
| 6,563,294 | B2 * | 5/2003 | Duffy et al. | 323/283 |
| 7,511,972 | B2 * | 3/2009 | Mohandes | 363/16 |

OTHER PUBLICATIONS

Li, Q. and Wolfs, P., "A Current Fed Two-Inductor Boost Converter with Lossless Snubbing for Photovoltaic Module Integrated Converter Applications", IEEE 2005, pp. 2111-2117, 0-7803-9033-4/05.
Chen, C. and Tseng, C., "Passive Loss Snubbers for DC/DC Converters", IEE 1998, IEE Proceedings online No. 19981877, pp. 396-401.
Tseng, C. And Chen, C., "Passive Loss Snubbers for DC/DC Converters", IEEE 1998, pp. 1049-1054, 07803-4340-9/98.
Liu, T., Guo, X., Zeng J. and Ying, J., "A Novel Energy Recycling Clamp Circuit", IEEE 2005, pp. 1205-1209, 0/7803-8975-1/05.
Pietkeiewicz, A., and Tollik, D., "Snubber Circuit and Mosfet Paralleling Considerations for High Power Boost-Based Power-Factor Correctors", IEEE 1995, pp. 41-45, 0/7803-2750-0/95.

\* cited by examiner

*Primary Examiner* — Adolf Berhane
*Assistant Examiner* — Yemane Mehari
(74) *Attorney, Agent, or Firm* — Grasso PLLC; Fred Grasso (57) ABSTRACT

An energy recovery circuit receives and stores energy associated with switching transitions in a power converter having a first switch and a second switch configured to be operated to selectively apply a voltage source to an output load. The energy recovery circuit includes an inductive element, a diode, and a capacitive element. The inductive element receives at least a portion of electrical current flowing through one of the first switch and the second switch. The at least a portion of the electrical current flows through the diode to charge the capacitive element with a voltage. The energy recovery circuit includes a recovery power converter to transfer the voltage from the capacitor.

7 Claims, 8 Drawing Sheets

FIG. 8

ENERGY RECOVERY CIRCUIT

BACKGROUND OF THE INVENTION

1. Technical Field

This invention relates to power converters, and more specifically to recovering energy associated with power dissipation occurring in power converter switches.

2. Related Art

Typical power converters implement one or more switches to selectively apply a voltage source to an output load. Various power converter configurations may be used such as a half-bridge configuration. Metal-oxide-semiconductor field-effect transistors (MOSFETs) may be used as the switches in the half-bridge arrangements. During operation, internal diodes of the MOSFETs may store electrical charge due to conduction properties of the internal diodes. Electrical current spikes through the MOSFETs may occur due to the stored electrical charge. These electrical current spikes may contribute to a significant amount of power to be lost through dissipation in the MOSFETs.

SUMMARY

According to one aspect of the disclosure, an energy recovery circuit may be implemented in a power converter to recover energy associated with switching transitions occurring to selectively supply a voltage source to one or more output loads drawing a direct current. The energy recovery circuit may include an inductive element electrically coupled to one or more switches of the power converter. The energy recovery circuit may include a diode electrically coupled to the inductive element and a capacitive element.

The inductive element may receive a portion of the current flowing through the electrically-coupled one or more switches. The current portion may flow through the diode to the capacitive element causing the capacitive element to store a voltage. The energy recovery circuit may further include a power converter to transfer the voltage stored in the capacitive element. The power converter of the energy recovery circuit may transfer the voltage to the voltage source or to another output load.

According to another aspect of the disclosure, the energy recovery circuit may include a plurality of inductive elements electrically coupled to one or more switches of the power converter. The energy recovery circuit may include a plurality of diodes electrically coupled to one or more of the inductive elements and the capacitive element. One or more of the inductive elements may receive a portion of the current flowing through the electrically-coupled one or more switches. The current portion may flow through one or more of the diodes to the capacitive element causing the capacitive element to store a voltage.

According to another aspect of the disclosure, an energy recovery circuit may be implemented in a power converter to recover energy associated with switching transitions occurring to selectively apply a voltage source of the power converter to one or more output loads drawing an alternating current.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

An energy recovery circuit may be implemented in a power converter configured to serve an output load. The energy recovery circuit may recover energy associated with energy dissipated in a switch of the power converter during an undesired switching condition, such as reverse recovery. The energy recovery circuit may transfer the recovered energy back to an initial source of the energy. The recovered energy may also be transferred by the energy recovery circuit for use in powering other circuits or loads.

Figure 1:
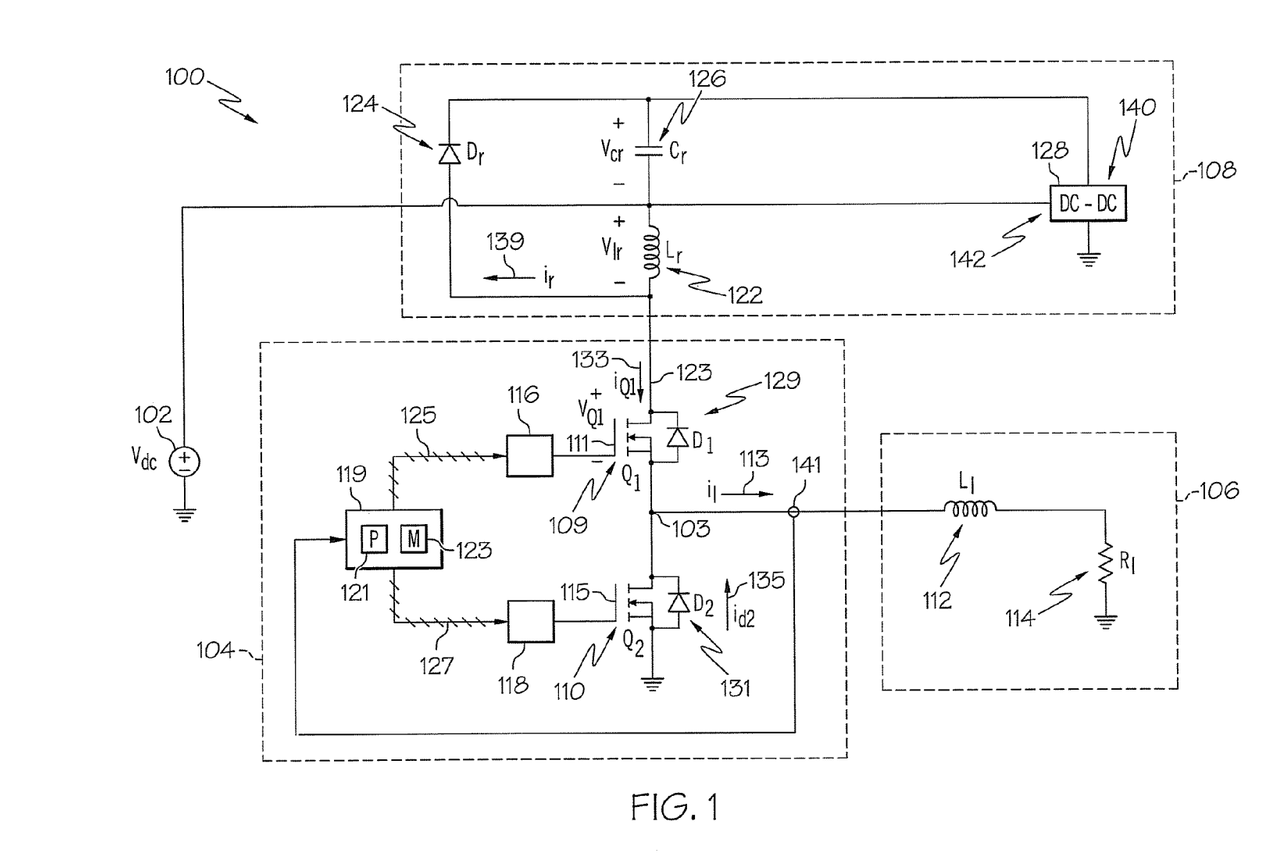
FIG. 1 is a circuit diagram of an example power converter having an energy recovery circuit.

FIG. 1 is a circuit diagram of an example power converter 100. The power converter 100 may include an input circuit 104 and an energy recovery circuit 108. The input circuit 104 may be electrically coupled to both a voltage supply 102 and an output load 106. In one example, the input circuit 104 may include a first switch (Q1) 109 and a second switch (Q2) 110. The switches 109, 110 may be alternately switched on and off to selectively supply voltage from the voltage supply 102 to the output load 106. In the example in FIG. 1, the power converter 100 may be a dc-dc converter and the switches 109, 110 may be in a half-bridge circuit arrangement. In FIG. 1, the output load 106 is represented as an inductive load including a load inductor ($L_1$) 112 and a load resistor ($R_1$) 114 having an approximately constant load current ($i_1$) 113. The output load 106 may be electrically coupled to the input circuit 104 between the switches 109, 110 at node 103.

In one example, the switches 109, 110 may be MOSFETs, each including a respective gate, drain, and source. A gate 111, 115 of each respective switch 109, 110 may be controlled by a respective gate drive circuit 116, 118. The gate drive circuits 116, 118 may provide a gate voltage to each respective switch 109, 110. An example of the gate drive circuits 116, 118 is described in more detail in FIG. 2. The gate drive circuits 116, 118 may be controlled by a controller 119. The controller 119 may include a processor 121 and a memory device 123. The memory device 123 may include one or more memories and may be computer-readable storage media or memories, such as a cache, buffer, RAM, removable media, hard drive or other computer readable storage media. Computer readable storage media may include various types of volatile and nonvolatile storage media. Various processing techniques may be implemented by the processor 121 such as multiprocessing, multitasking, parallel processing and the like, for example. The processor 121 may include one or more processors. The controller 119 also may be a logic circuit and field-programmable gate array, a combination of processors and logic, or another other circuit or device capable of controlling the switches.

The controller 119 may be electrically coupled to each gate drive circuit 116, 118 via a respective control line 125, 127. The controller 119 may provide control signals to each gate drive circuit 116, 118 via the respective control lines 125, 127. The control signals may indicate to each gate drive circuit 116, 118 the appropriate times to turn the switches 109, 110 on and off. In one example, the controller 119 may monitor the load current 113 via a current sensor 141. The controller 119 may determine the switching frequency and duty cycles of the switches 109, 110 based on the sensed load current 113.

In a conventional half-bridge circuit arrangement without an energy recovery circuit, the switches 109, 110 are operated to each be switched on during different time periods. This switching arrangement allows voltage from the voltage supply 102 to be selectively supplied to the output load 106. Ideally, the optimum switching strategy would be to turn on one of the switches 109, 110 and turn the other switch off simultaneously. However, simultaneous switching or near simultaneous switching may result in "shoot-through" current likely destroying or heavily damaging both of the switches 109, 110. To avoid shoot-through current, the switches 109, 110 may be operated such that a "dead-time" exists in which both switches 109, 110 are off at some point between the switching transitions of the switches 109, 110.

In a conventional half-bridge circuit power converter, the switches 109, 110 typically drive an inductive current, such as the load current 113, during operation, which approximates a constant current source for a dead-time of a short duration relative to the switching frequency. However, during the dead-time, no switch is available to provide a path for the inductive current to flow through. A passive switch, such as a diode, may be used for each switch 109, 110 to conduct the inductive current during the dead-time. In FIG. 1, a respective diode 129, 131 is shown being electrically coupled in parallel with each switch 109, 110. In one example, the diodes 129, 131 may be internal "body diodes" to each MOSFET switch 109, 110 that are formed of the semiconductor body intrinsic to a typical MOSFET. In other examples, the diodes 129, 131 may be externally electrically coupled to the MOSFET switches 109, 110, or other suitable switches, and electrically coupled as shown in FIG. 1.

In the conventional half-bridge circuit power converter, when both of the switches 109, 110 are off, one of the diodes 129, 131 may conduct the inductive current during the dead-time, which may prevent an overvoltage condition from occurring. Without the diodes 129, 131, a large voltage spike may occur likely damaging or destroying the switches 109, 110. However, the diodes 129, 131 may exhibit "reverse recovery." Reverse recovery occurs when the diodes 129, 131 conducting current begin to store charge in a semiconductor junction.

Once the "dead-time" has lapsed, the conducting diode 129 or 131 shuts off and the stored charge requires release. As the opposite switch 109 or 110 is turned on, the conducting diode 129, 131 attempts to shut off, but the reverse recovery condition holds the diode 129, 131 on until the stored charge has cleared. As a result, one of the switches 109, 110 and the opposite conducting diode 129, 131 are both on simultaneously. Under these operating conditions, short circuiting of the voltage supply 102 may occur causing a large current spike referred to as the "reverse recovery current." The reverse recovery current is undesirable because as the reverse recovery current flows through the switch 109 or 110 that is turned on, voltage from the voltage supply 102 is also being applied across the conducting switch 109 or 110, resulting in a significant amount of power dissipated in the switches 109, 110.

For example, in the power converter 100, without the energy recovery circuit 108, when the switch 109 is off and the switch 110 is on, the load current 113 may be flowing through the switch 110. As the switch 110 is turned off, the load current 113 may begin to flow through the diode 131. As the switch 109 turns on, the switch current ($i_{Q1}$) 133 of the switch 109 may begin to flow. The diode 131 cannot immediately turn off due to the charge built up and is reverse biased due to switch 109 being turned on. As the switch current 133 begins to flow through the switch 109, diode current ($i_{d2}$) 135 flowing through the diode 131 eventually reaches zero Amperes (A), but because the diode 131 needs to remove the stored charge, diode current 135 will flow negatively through the diode 131. Because of the stored charge, the current 133 initially flows through the switch 109 rises very quickly as a current spike. The load current 113 is approximately constant, so the excess current flows through the diode 131 as the diode current 135. As previously described, because the voltage source 102 is applied to switch 109 during this current spike, the power dissipated in switch 109 may be significant.

In FIG. 1, the energy recovery circuit 108 may capture and store energy associated with the reverse recovery current. In one example, the stored energy may be returned to the voltage supply 102. In FIG. 1, the energy recovery circuit 108 may include a recovery inductor ($L_r$) 122. The recovery inductor 122 may be electrically coupled to the drain 123 of the switch 109 and to the positive terminal of the voltage supply 102. The energy recovery circuit 122 may also include a recovery diode ($D_r$) 124 and a recovery capacitor ($C_r$) 126. An anode of the recovery diode 124 is electrically coupled to the drain 123 of the switch 109 and the recovery inductor 122. The recovery capacitor 126 may be electrically coupled to both the recovery inductor 122 and a cathode of the recovery diode 124, as shown in FIG. 1.

During operation, when one of the switches 109, 110 is turned on after the dead-time, the opposite diode 129, 131 may remain on as well, creating the conditions leading to reverse recovery current as previously described. The presence of the recovery inductor 122 may limit the rate at which current flowing through the switches 109 and 110 increases. The switch current 133 may increase to the level of the load current 113 as the diode current 135 decreases towards zero Amperes. However, the diode 131 may still be storing charge associated with reverse recovery causing the diode 131 to conduct a relatively negative diode current 135, thus a short circuit path through the switch 109 and the diode 131 may exist. Eventually, the diode 131 turns off, while current in excess of the load current 113 exists in the recovery inductor 122 and the switch 109. The current amount through the recovery inductor 122 exceeding the load current 113—recovery current ($i_r$) 139—may be directed through the recovery diode 124, causing the recovery diode 124 to turn on. The turning on of the recovery diode 124 connects the recovery capacitor 126 in parallel with the recovery inductor 122, causing the voltages of the recovery inductor 122 ($V_{r1}$) and the recovery capacitor 126 ($V_{cr}$) to be equal in magnitude, but opposite in polarity. At this point, the current flowing through the recovery inductor 122 may decrease to the value of the load current 113. Eventually, the recovery diode 124 turns off, with the voltage stored in the recovery capacitor 126 representing the energy initially stored in the diode 131 as the reverse recovery charge and subsequently as the current stored in the recovery inductor 122.

The energy recovery circuit 108 may also include a recovery power converter 128. In FIG. 1, the recovery power converter 128 may be a step-down dc-dc converter. The recovery power converter 128 may include an input 140 and an output 142. The input 140 of the recovery power converter 128 may be electrically coupled to the recovery capacitor 126 and the output 142 may be electrically coupled to the voltage source 102. The recovery power converter 128 may transfer the voltage stored in the recovery capacitor 126 back to the voltage supply 102 via current, as discussed later. In the energy recovery circuit 108 of FIG. 1, without the recovery power converter 128 transferring voltage from the recovery capacitor 126 back to the voltage supply 102, the recovery capacitor 126 would continue to build charge each time one of the switches 109, 110 are turned on causing the voltage of the recovery capacitor 126 to incrementally increase. The recovery power converter 128 may periodically relieve the recovery capacitor 126 of this voltage, and thus, energy associated with the reverse recovery current is recovered and returned to the voltage supply 102.

Figure 2:
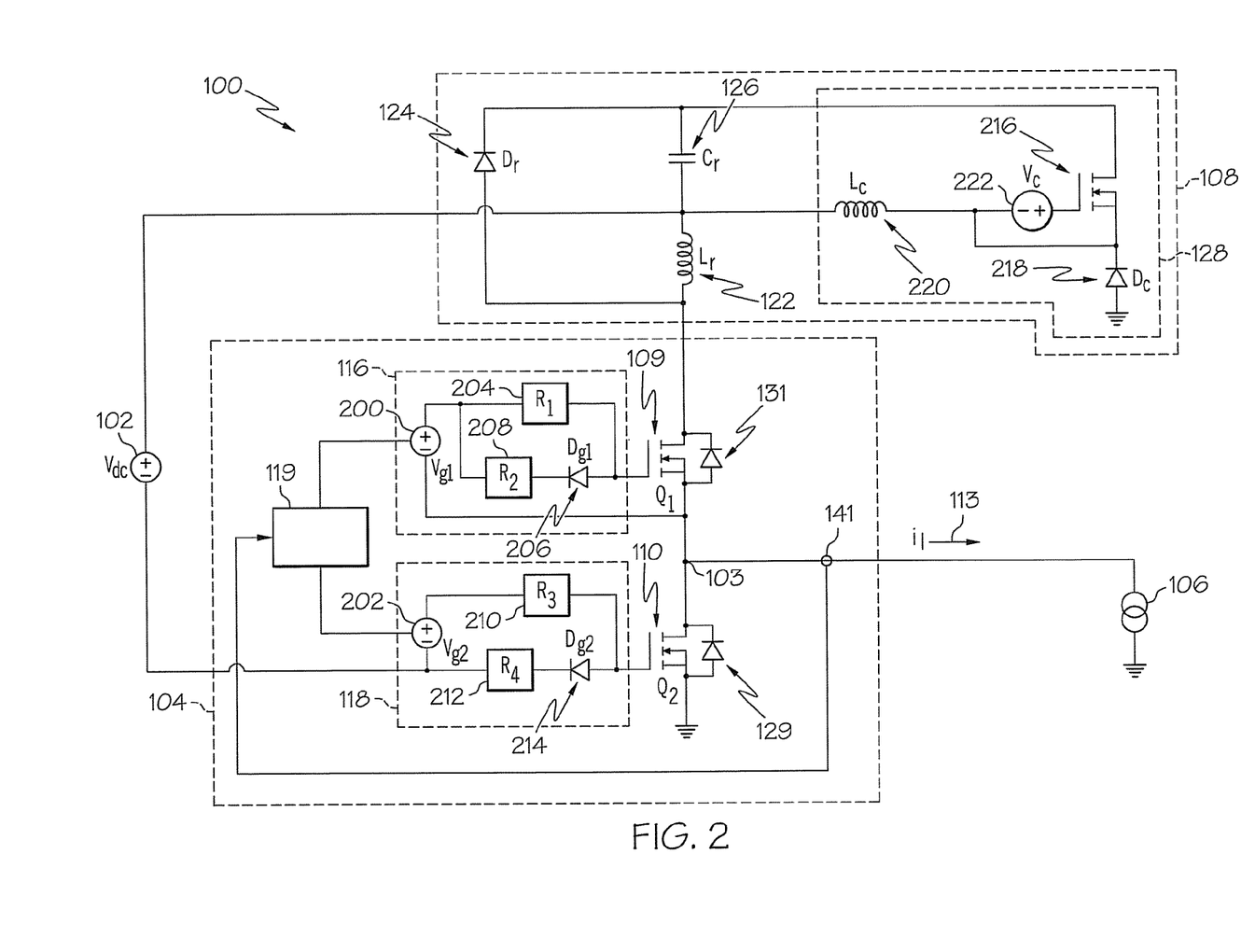
FIG. 2 is another circuit diagram of the power converter of FIG. 1.

FIG. 2 is an example of the power converter 100 showing a detailed example of the gate drive circuits 116, 118 and the recovery power converter 128. Each gate drive circuit 116, 118 may include a voltage pulse generator ($V_{g1}$ and $V_{g2}$), 200, 202, respectively. The pulse generators 200, 202 provide the gate voltages for each of the switches 109, 110, respectively, to control the turning on and off of the switches 109, 110. The pulse generators 200, 202 may be operated by the controller 119. The controller 119 may provide signals to the pulse generators in order to control the switching frequency of the switches 109, 110.

Gate drive circuit 116 may include a first resistive element ($R_1$) 204 and a gate diode ($D_{g1}$) 206 each electrically coupled to the gate 111 (FIG. 1) of the switch 109. The gate drive circuit 116 may also include a second resistive element ($R_2$) 208 electrically coupled between the first resistive element 204 and the gate diode 206. The first and second resistive elements 204, 208 sizes may be selected to limit the rate of increase or decrease of the voltage between the gate 111 and the source of the switch 109. Limiting the rise or fall of this voltage may reduce noise arising from turning the switch 109 on and off at a relatively high switching frequency.

The gate diode 206 may be used to effectively change the resistance in the gate drive circuit 116 as experienced by the switch 109 by causing either a single resistive element 204 to be used or both resistive elements 204, 208 to be used in the gate drive circuit 116. The gate drive circuit 118 may include third and fourth resistive elements ($R_3$, $R_4$) 210, 212 and a gate drive diode ($D_{g2}$) 214 arranged in manner similar to that described with regard to the gate drive circuit 116.

In FIG. 2, one example of the recovery power converter 128 is shown. The recovery power converter 128 may include a converter switch ($Q_c$) 216, a converter diode ($D_c$) 218, a converter inductor ($L_c$) 220, and a converter pulse generator ($V_c$) 222. As described with regard to FIG. 1, the recovery capacitor 126 may build up charge each time one of the switches 109, 110 is switched. The recovery power converter 128 may step down the voltage stored in the recovery capacitor 126 and return it to the voltage source 102 via current in the configuration of FIG. 2. The recovery pulse generator 222 may operate at a particular predetermined fixed or variable frequency in order to transfer the energy in the recovery capacitor 126 back to the voltage supply 102. In one example, a separate controller (not shown), or the controller 119, may operate the recovery pulse generator 222 to selectively supply to the voltage stored in the recovery capacitor 126 to the voltage supply 102.

In FIG. 2, the converter switch 216 may be implemented with a MOSFET switch, however, in other examples one or more other suitable switches may be used in order to configure the dc-dc recovery power converter 128. In FIG. 2, the example recovery power converter 128 has a conventional buck-boost topology. In alternative examples, the recovery power converter 128 may be based on other power converter topologies such as a buck converter; a flyback converter, a forward converter, a boost-buck converter, or any suitable power converter topology that may be used to connect a higher voltage supply to a lower voltage supply.

Figure 3:
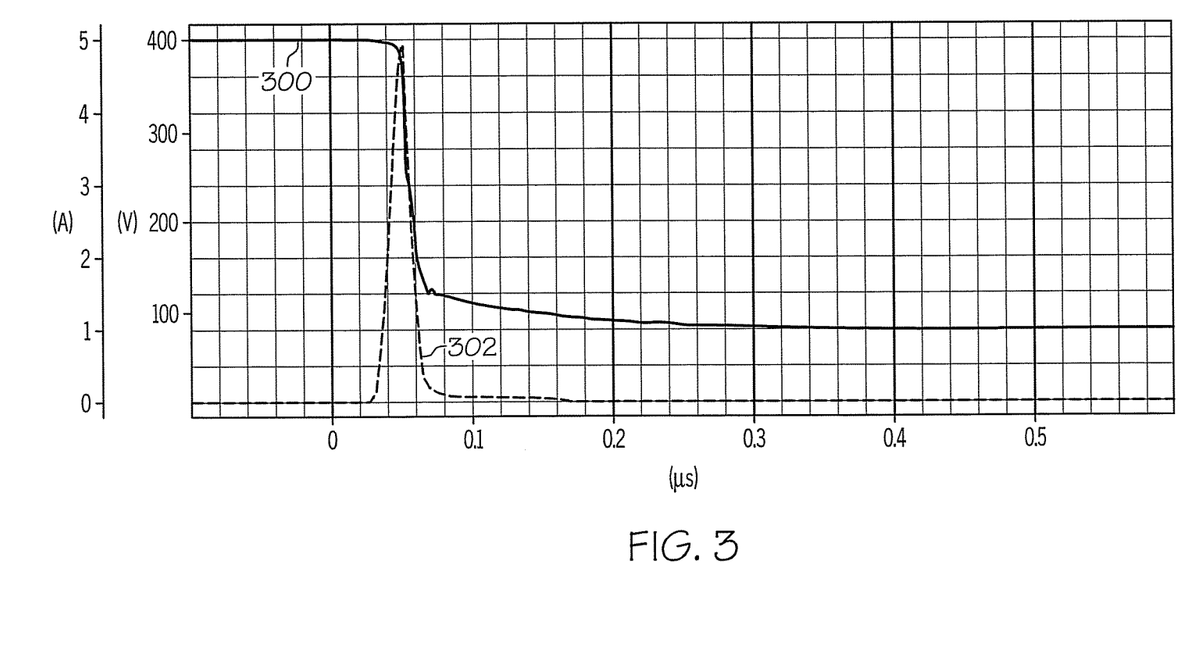
FIG. 3 is a waveform plot of switch current and switch voltage behavior of an example power converter.
Figure 4:
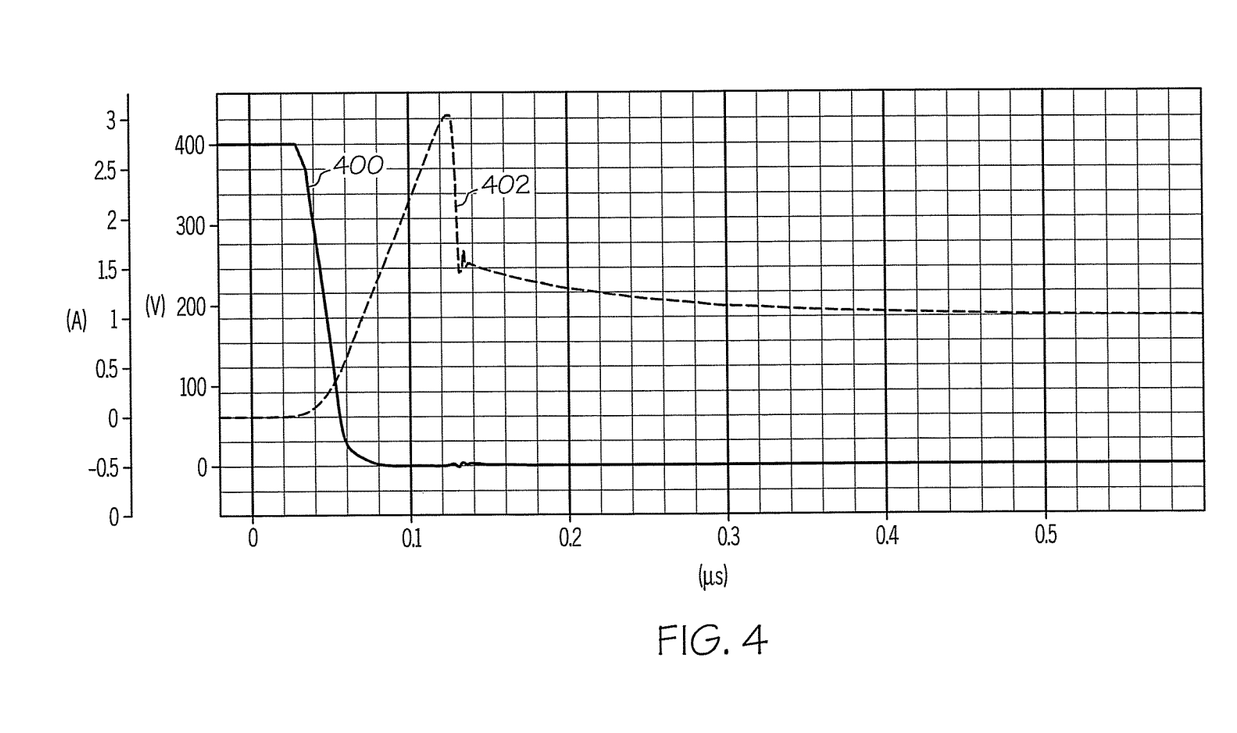
FIG. 4 is a waveform plot of switch current and switch voltage behavior of an example power converter including an energy recovery circuit.

FIGS. 3 and 4 are waveforms illustrating an example effect on reverse recovery current by the energy recovery circuit 108. The waveforms of FIGS. 3 and 4 are based on particular circuit parameters and conditions listed in Table 1.

TABLE 1

| Parameter | Example Value |
| --- | --- |
| $V_{dc}$ | 400 volts (V) |
| $i_l$ | 1 A |
| $L_r$ | 10 micro-Henries (µH) |
| $R_1$, $R_3$ | 100 Ohms (Ω) |
| $R_2$, $R_4$ | 20 Ohms (Ω) |
| Dead-Time | 100 nanoseconds (ns) |
| Gate Signal Pulse Width | 50 ns |
| Duty Cycle | 50% |
| Switching Frequency | 50 kilo-Hertz (kHz) |

In the plots of FIGS. 3 and 4, each of the switches 109, 110 are a SPD06N60C3 MOSFET produced by Infineon Technologies AG of Neubiberg, Germany. In the plot of FIG. 4, the recovery diode 124 of the power converter 100 is an MUR160 diode produced by Vishay Intertechnolgy, Inc. of Malvern, Pa.

In the power converter 100 without the energy recovery circuit 108, when the switch 109 is off and the switch 110 is on, the load current 113 may be flowing through the switch 110. As switch 110 is turned off, the load current 113 may flow through the diode 131. As previously discussed, the diode 131 may store charge associated with conduction. As the current through the diode 131 approaches zero Amperes, the current through the diode 131 will become negative to clear out the charge, thus causing a large current spike through the switch 109.

FIG. 3 illustrates the behavior of the power converter 100 without the energy recovery circuit 108. In FIG. 3, the waveforms for both the voltage (V) (FIG. 1) and current (A) 133 (FIG. 1) of the switch 109 are shown during the event of the switch 109 being turned on subsequent to a dead-time period. Waveform 300 shows the voltage across the switch 109 initially at approximately 400 V. Waveform 302 shows the current through the switch 109 as initially being approximately zero, since the switch is turned off. The switch 109 may be turned on at time t=0 and, initially, the switch current 302 may increase, while the switch voltage 300 remains at approximately 400 V. The switch current 302 peaks at approximately 5 A, while the switch voltage 300 only begins to drop and is still above 350 V during the current spike of the switch current 302. The switch voltage 300 does not drop to approximately zero volts until after the current 302 has dropped to approximately 1.25 A. While the turning on of the switch 109 ideally results in the switch voltage 300 immediately dropping to zero volts, as shown in FIG. 3, the voltage 300 takes approximately 0.17 microseconds (µs) to reach approximately zero volts upon the turning on of the switch 109. However, as previously discussed, the voltage source 102 will be applied across the switch 109 during the reverse recovery current condition, while the charge is being swept out of the diode 131. Thus, the voltage across the switch 109 occurs while the switch current 133 is experiencing the reverse recovery effect causing a substantial amount of power to be lost through dissipation in the switch 109. In FIG. 3, 3.23 W is lost in the switch 109 for a 201 W output, resulting in an efficiency of 98.3%.

FIG. 4 shows an example of the voltage and current behavior of the switch 109 during the same turn on event of the switch 109 as shown in FIG. 3. In FIG. 4, waveform 400 represents the voltage (V) across the switch 109 and the waveform 402 represents the switch current (A) 133. Using the parameter values of Table 1, the peak of the switch current 133 is substantially lower than that in FIG. 3. In FIG. 4, the switch current 133 of the switch 109 peaks at approximately 3 A. However, the current peak no longer occurs while the voltage across the switch 109 is still approximately that of the voltage supply 102. Thus, the total power dissipated in the switch 109 may be lower with the energy recovery circuit 108. As discussed, in FIG. 3, total power dissipated during the reverse recovery condition is 3.23 watts (W). In FIG. 4, the amount of power dissipated in the switch 109 due to reverse recovery is 491 mW. The energy recovery circuit 108 may recover energy associated with the difference in power dissipation and return the energy to the voltage supply 102 as discussed with regard to FIGS. 1 and 2. The example parameter values of Table 1 are merely for illustrative purposes. Various parameters may be selected allowing the energy recovery circuit 108 to operate in the manner previously described.

Figure 5:
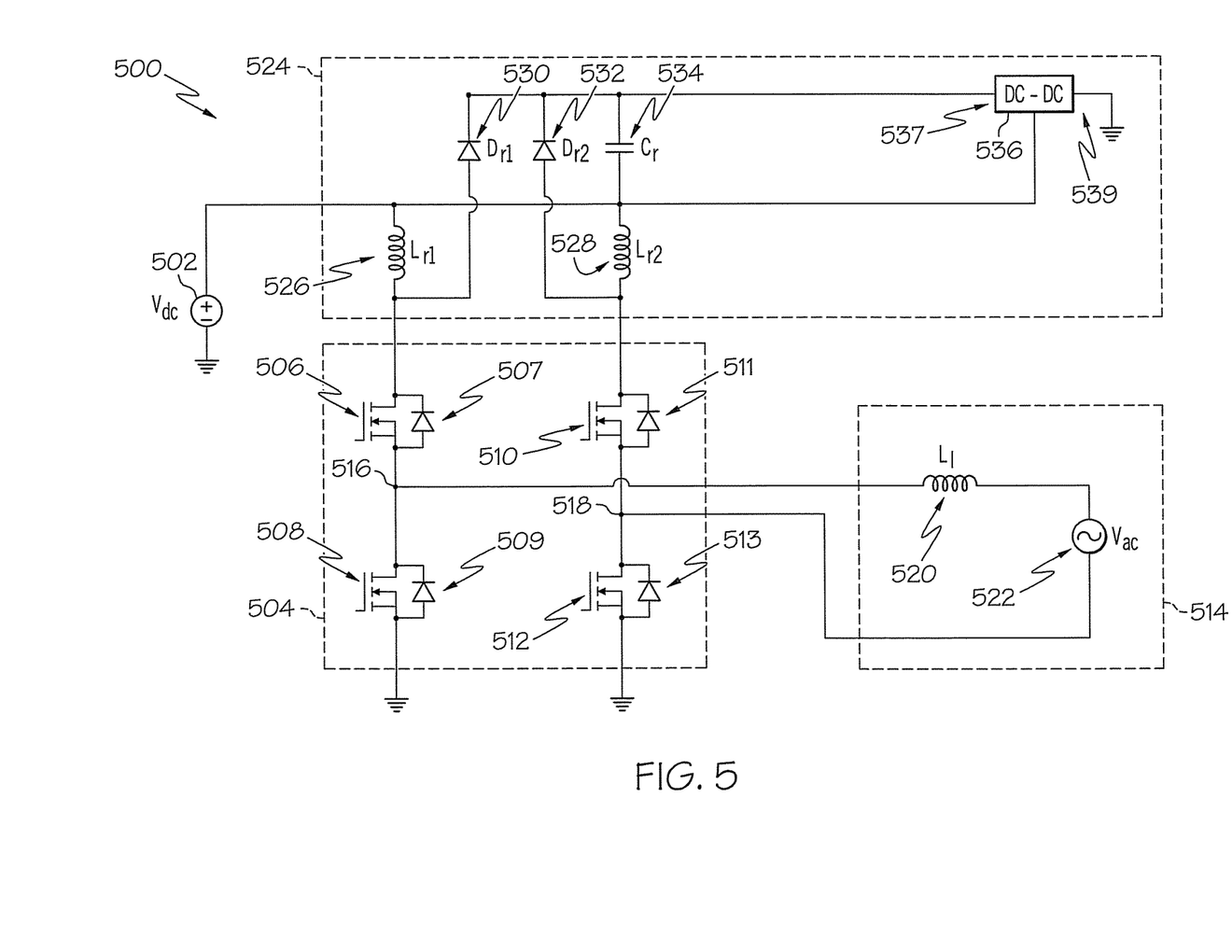
FIG. 5 is a circuit diagram of an example power converter to supply an alternating current to an output load and including an energy recovery circuit.

FIG. 5 is a schematic of an example power converter 500 that may serve an alternating current (AC) load. In FIG. 5, the power converter 500 may include an input circuit 504 electrically coupled to a DC voltage source ($V_{dc}$) 502. The input circuit 504 may include four switches 506, 508, 510, and 512. In the example of FIG. 5, the switches 506, 508, 510, and 512 may be MOSFETs. The switches 506, 508, 510, and 512 may be arranged into switching pairs, such that switches 506 and 512 form one switching pair and the switches 508 and 510 form another switching pair. An output load 514 may be electrically coupled at nodes 516 and 518 between each pair of switches 506, 508 and 510, 512.

The power converter 500 may serve an inductive load 519 represented by load inductance ($L_1$) 520 and an AC load ($V_{ac}$) 522. To serve the alternating load of the output load 514, the opposite switch from each switch pair 506, 512 and 508, 510 may share the same on/off times. For example, switches 506 and 512 may be on simultaneously, allowing the current from the voltage source 502 to flow through the switch 506 to the output load 514 and through the switch 512. The switches 508 and 510 are off during this time. The switches 506 and 512 may be turned off and the switches 508 and 510 may be turned on allowing the current flowing out of the voltage source 502 to flow through the output load 514 in the other direction, thus providing the alternating current. The switches 506, 508, 510, 512 may be selectively controlled by one or more controllers (not shown) such as the controller 119 described with regard to FIGS. 1 and 2.

For similar reasons discussed with regard to FIG. 1, during operation, all switches 506, 508, 510, and 512 may be off, providing a dead-time between switching transitions. Other switching configurations may be implemented such as those having overlapping on times, such that not all of the switches are off at any one time. Reverse recovery conditions may occur in diodes 507, 509 when both diodes 507, 509 are off and may occur in the diodes 511, 513 when both diodes 511, 513 are off. An energy recovery circuit 524 may be used to store energy associated with reverse recovery current occurring in each switch pair 506, 512 and 508, 510. The energy recovery circuit 524 may include a first recovery inductor ($L_{r1}$) 526 and second recovery inductor ($L_{r2}$) 528 associated with each switch pair 506, 510 and 508, 512. The recovery inductors 526, 528 may be electrically coupled to the drain of each switch 506 and 510, respectively. The energy recovery circuit 524 may include a first recovery diode ($D_{r1}$) 530 and a second recovery diode ($D_{r2}$) 532. Each recovery diode 530, 532 may have a respective anode electrically coupled to the drains of a respective switch 506, 510 and a respective recovery inductor 526, 528. The recovery diodes 530, 532 may each have a respective cathode electrically coupled to a recovery capacitor 534. The energy recovery circuit 524 may also include a recovery power converter 536 having an input 537 and an output 539. The recovery power converter 536 may be a step-down dc-dc converter similar to the recovery power converter 128. The input 537 may be electrically coupled to the recovery capacitor 534 and the anodes of the recovery diodes 530 and 532. The output 539 of the recovery power converter 536 may be electrically coupled to the voltage source 502. In FIG. 5, the recovery power converter 536 is a dc-dc converter.

The energy recovery circuit 524 may operate in substantially the same manner as the energy recovery circuit 108. For example, as the switching of each switch pair 506, 512 and 508, 510 occurs, charge may build up in the diodes 509, 513 depending on the particular diode conducting during the dead time. As the next switch pair 506, 512 or 508, 510 is turned on, reverse recovery current may occur causing a particular recovery inductor 526, 528 to receive the reverse recovery current and store the associated energy in the recovery capacitor 534 in the manner similarly described with regard to FIGS. 1 and 2. The recovery power converter 536 may be operated to return the energy stored in the capacitor 534 as a stored voltage to the voltage source 502.

Figure 6:
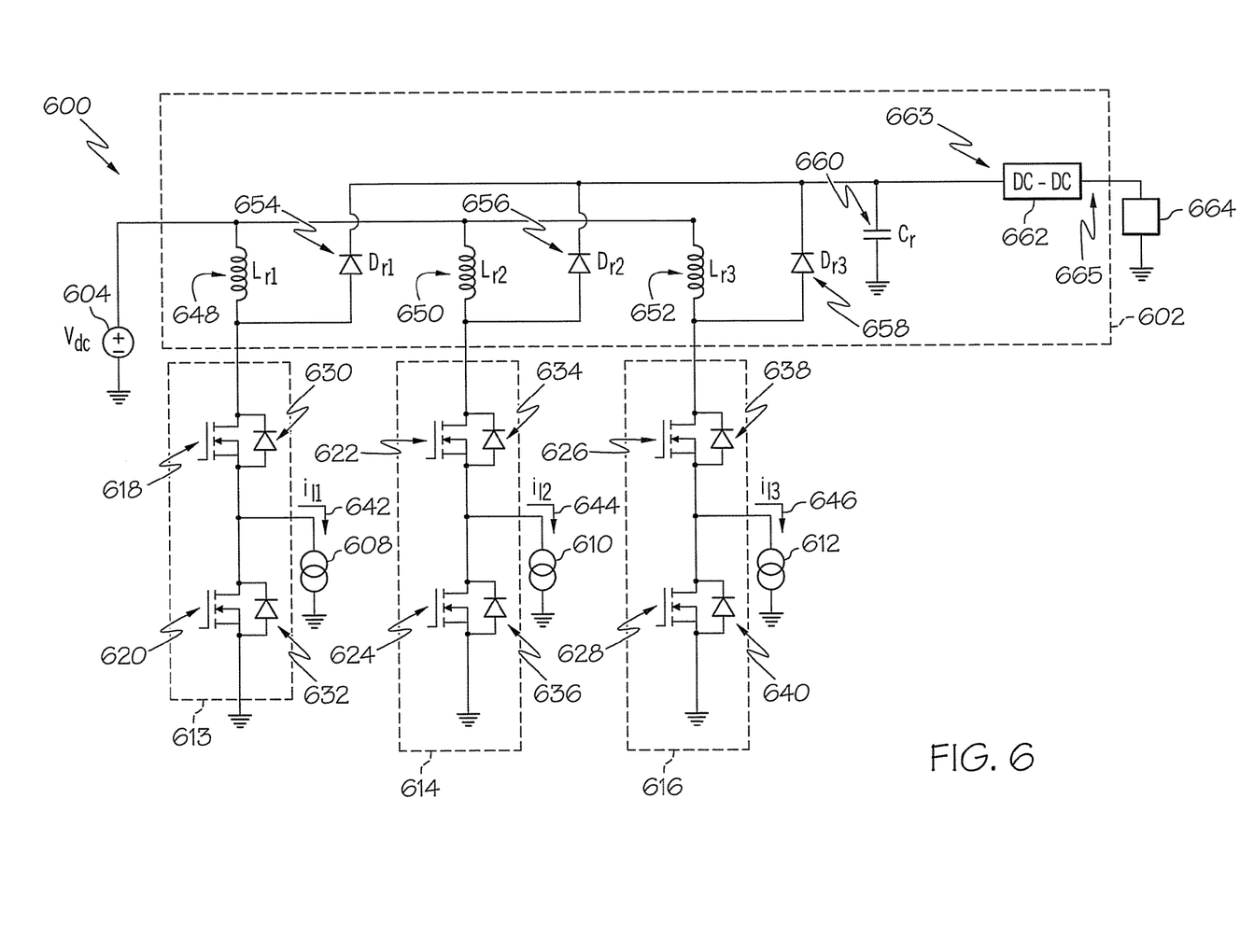
FIG. 6 is a circuit diagram of an example power converter to supply a plurality of output loads and including an energy recovery circuit.

FIG. 6 is a circuit diagram showing an example power converter 600 having an energy recovery circuit 602 implemented for three separate inductive loads 608, 610, 612. The power converter 600 may be electrically coupled to a voltage source ($V_{dc}$) 604 and include three input circuits 613, 614, and 616 each including a pair of switches 618-620, 622-624, and 626-628. Each switch 618, 620, 622, 624, 626, and 628 includes a respective diode 630, 632, 634, 636, 638, and 640. In the example of FIG. 6, the switches 618, 620, 622, 624 626, and 628 may be MOSFET and the diodes 630, 632, 634, 636, 638, and 640 may be intrinsic body diodes of each MOSFET. However, other suitable switch types may be used with diodes externally electrically coupled as illustrated in FIG. 6. Each switch pair 618-620, 622-624, and 626-628 may be selectively operated to serve the respective inductive load 608, 610, and 612 such that each inductive load 608, 610, and 612 draws a relatively constant load current (il1, il2, and il3) 642, 644, and 646, respectively. Each switch pair switch pair 618-620, 622-624, and 626-628 may be selectively controlled by one or more controllers (not shown) such as the controller 119 described with regard to FIGS. 1 and 2.

As each switch pair 618-620, 622-624, and 626-628 is controlled to selectively apply the voltage source 604 to the respective inductive load 608, 610, 612, each switch pair 618-620, 622-624, and 626-628 is susceptible to reverse recovery current. The energy recovery circuit 602 may recover energy resulting from reverse recovery current associated with each switch pair switch pair 618-620, 622-624, and 626-628. The energy recovery circuit 602 may include a first recovery inductor 648, a second recovery inductor 650, and a third recovery inductor 652. Each recovery inductor 648, 650, and 652 is electrically coupled to a drain of the respective switch 618, 622, 626. The energy recovery circuit 602 may also include a first recovery diode 654, second recovery diode 656, and a third recovery diode 658. Each recovery diode 654, 656, and 658 may have a respective anode electrically coupled to the drain of a respective switch 618, 622, 626 and a respective recovery inductor 648, 650, and 652. The recovery diodes 654, 656, and 658 may each have a respective cathode electrically coupled to a recovery capacitor 660. The recovery capacitor 660 may also be electrically coupled to electrical ground. The recovery capacitor 660 and recovery diodes 654, 656, and 658 may each be electrically coupled to an input 663 of a recovery power converter 662. In FIG. 6, the recovery power converter 662 may be a step down dc-dc converter. Various topologies may be used for the recovery power converter 662 such as that described with regard to the recovery power converter 128 of FIG. 1.

The energy recovery circuit 602 may function similarly to the energy recovery circuit 108 with the recovery capacitor 660 ultimately storing energy associated with reverse recovery current experienced by each of the switch pairs 618-620, 622-624, and 626-628. However, in the example of FIG. 6, the recovery power converter 662 may transfer the energy in the recovery capacitor 660 stored as a voltage to a secondary output load 664 also electrically coupled to an output 665 of the recovery power converter 662 and to ground. The secondary output load 664 may represent some load that may require power to allow the power converter 600 to function. For example, the secondary output load 664 may represent one or more controllers used to control the switch pairs 618-620, 622-624, and 626-628, such as the controller 119 described with regard to the power converter 100. Alternatively, the secondary load 664 may represent any load able to receive the energy stored in the recovery capacitor 660 via the recovery power converter 662. Use of a secondary load 664 allows the energy associated with reverse recovery to be used for some purpose that may otherwise have required power from the voltage source 602. Thus, the energy typically dissipated in switching the switch pairs 618-620, 622-624, and 626-628 may be recovered and used for another purpose.

Figure 7:
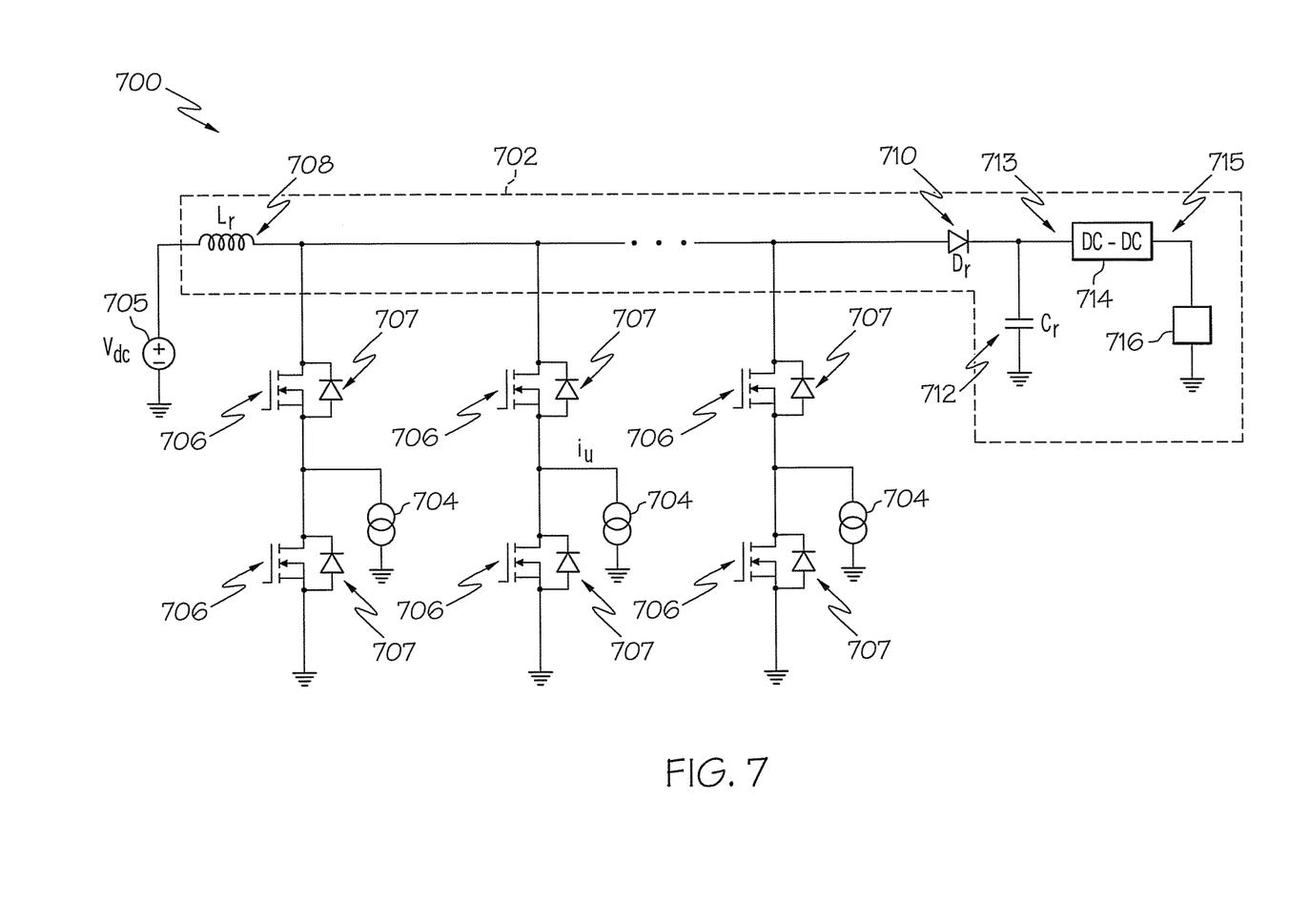
FIG. 7 is a circuit diagram of another example power converter to supply a plurality of output loads and including an energy recovery circuit.

FIG. 7 is a circuit diagram of an example power converter 700 having an energy recovery circuit 702. The power converter 700 may serve N inductive output loads 704 each drawing an approximately constant current from a voltage source 705. The power converter 700 may include a plurality of switch pairs 706 for each inductive load 704. Each switch pair 706 may operate in substantially the same manner as that described with regard to FIGS. 1, 2, and 6. In the example of FIG. 7, each switch pair 706 may include a pair of MOSFETs each including a body diode 707 and experience reverse recovery current as previously described. The switches included in the switch pairs 706 may be selectively controlled by one or more controllers (not shown) such as the controller 119 described with regard to FIGS. 1 and 2.

The energy recovery circuit 702 may include a single inductance, represented by the recovery inductor ($L_r$) 708 allowing reverse recovery current associated with each switch pair 706 to be limited by the recovery inductor 708. The energy recovery circuit 702 may also include a recovery diode ($D_r$) 710 having an anode electrically coupled to the recovery inductor 708, and a drain of one switch from each switch pair 706. The recovery diode 710 may have a cathode electrically coupled to a recovery capacitor ($C_r$) 712, and an input 713 of a recovery power converter 714. The recovery capacitor 712 may be electrically grounded.

At least a portion of the current flowing from the voltage source 705 through the recovery inductor 708 may flow through a recovery diode 710 forcing the recovery diode 710 to turn on and causing the recovery capacitor 712 to charge up from the current. In the example power converter 700 of FIG. 7, the recovery power converter 714 may be a step down dc-dc converter, similar to the recovery power converter 128. The recovery power converter 714 may transfer the energy stored in the recovery capacitor 712 to a secondary output load 716 in a manner similar to that described with regard to FIG. 6. The secondary output load 716 may serve similar purposes as that described with regard to the secondary output load 664.

Figure 8:
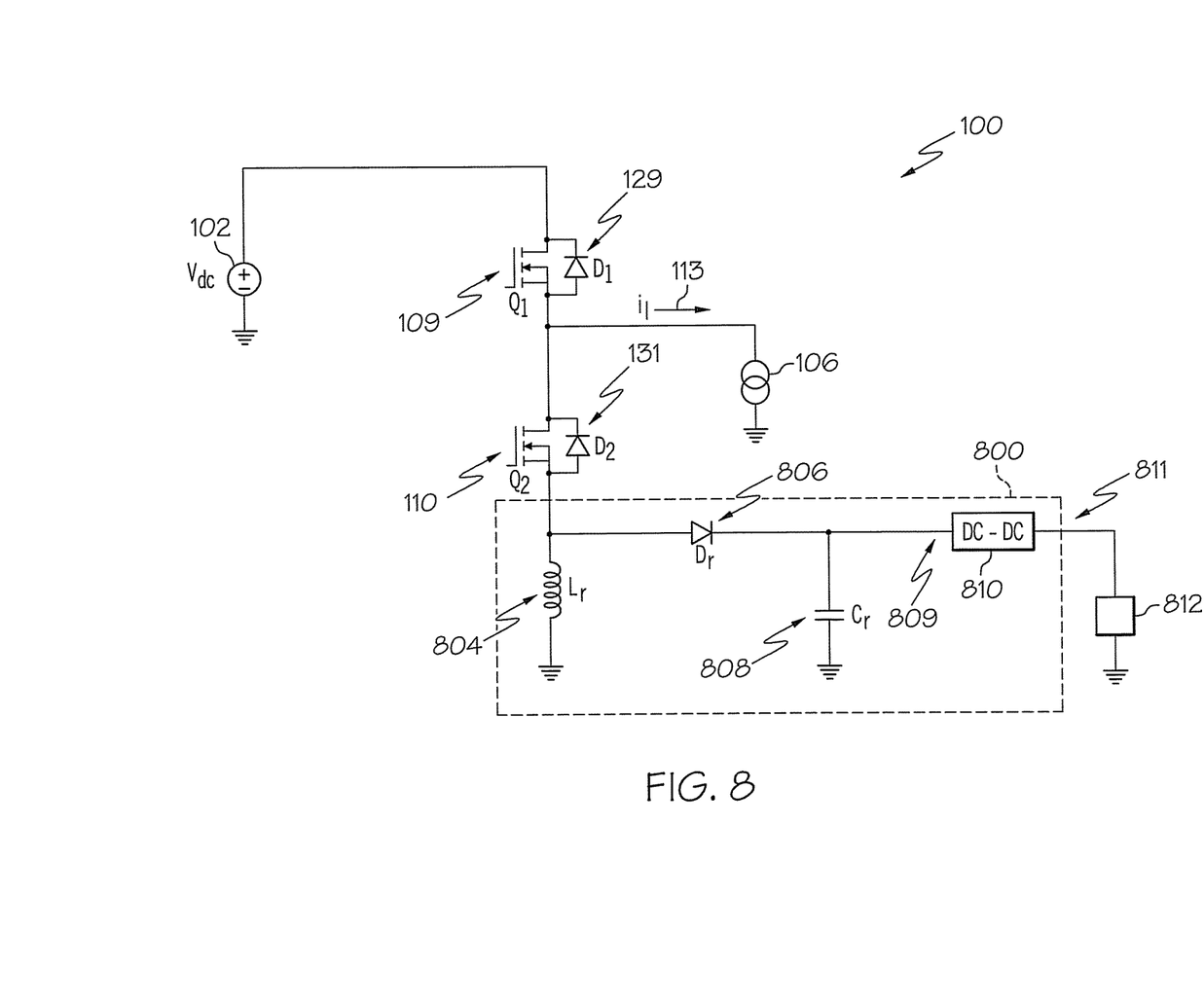
FIG. 8 is a circuit diagram of the power converter of FIG. 1 including an alternative energy recovery circuit.

FIG. 8 shows the example power converter 100 with an alternative energy recovery circuit 800. For ease of illustration, the power converter 100 is shown in FIG. 8 without the controller 119 and gate drive circuits 116, 118. The energy recovery circuit 800 is electrically coupled to a source of switch 110. The energy recovery circuit 802 includes a recovery inductor ($L_r$) 804, a recovery diode ($D_r$) 806, a recovery capacitor ($C_r$) 808, and a recovery power converter 810. The recovery inductor 804 may be electrically coupled to the source of the switch 110 and an anode of the recovery diode 806. The recovery diode 806 may have a cathode electrically coupled to a terminal of the recovery capacitor 808 and an input 809 of a recovery power converter 810. The recovery capacitor 808 may also be electrically coupled to ground. The recovery power converter 810 may be a step down dc-dc converter and various topologies may be used similar to the recovery power converter 128. An output 811 of the recovery power converter 810 may be electrically coupled to a grounded secondary load 812.

The energy recovery circuit 800 may receive the reverse recovery current flowing through the switch 109 and the diode 131. The energy associated with the reverse recovery current may be stored in the recovery capacitor 808. Similar to that described in FIGS. 6 and 7 the recovery power converter 810 may transfer the energy stored in the recovery capacitor 808 as a voltage to the secondary load 812. In alternative arrangements, the output 811 of the recovery power converter 810 may be electrically coupled between the recovery capacitor 808 and the voltage source 102 allowing the energy stored in the recovery capacitor 808 to be transferred to the voltage source 102 by the recovery power converter 810.

While various embodiments of the invention have been described, it will be apparent to those of ordinary skill in the art that many more embodiments and implementations are possible within the scope of the invention. The various embodiments described herein include a variety of electrical elements and combinations of electrical elements, such as inductors, capacitors, voltage sources, switches, resistors, diodes, and power converters electrically coupled in various manners. The described example configurations of electrical elements and devices are examples that may be embodied through equivalent configurations having additional or fewer of the described elements, circuits, and devices, and alternative elements, alternative circuits, and/or alternative devices within the scope of invention. Accordingly, the invention is not to be restricted except in light of the attached claims and their equivalents.

We claim:
1. A power converter comprising:
a first MOSFET and a second MOSFET each electrically coupled to the voltage source, wherein the first and sec- ond MOSFETs each have a respective gate terminal, drain terminal, and source terminal, wherein the first and second MOSFETs are controlled to selectively supply a voltage source to an output load electrically coupled to an electrical node between the first MOSFET and the second MOSFET, wherein the source terminal of the first MOSFET and the drain terminal of the second MOSFET are each electrically coupled to the output load;

an energy recovery circuit electrically coupled to the voltage source and to the first and second MOSFETs, wherein the energy recovery circuit comprises an inductive element electrically coupled to one of the drain terminal of first MOSFET and the source terminal of the second MOSFET; and a third MOSFET and a fourth MOSFET, wherein the third and fourth MOSFETs each have a respective gate terminal, drain terminal, and source terminal, wherein the drain of the third MOSFET is electrically coupled to the voltage source and the source of the third MOSFET is electrically coupled to the drain of the fourth MOSFET, wherein the first, second, third, and fourth MOSFETs are controlled to selectively apply an alternating current from the voltage source to the output load electrically coupled to the electrical node and a second electrical node between the third and the fourth MOSFETs, wherein the source terminal of the third MOSFET and the drain terminal of the fourth MOSFET are each electrically coupled to the output load, and wherein the first inductive element has a first inductor terminal configured to be electrically coupled to the voltage source and a second inductor terminal electrically coupled to the drain of the first MOSFET, wherein the energy recovery circuit further comprises a second inductive element having a first inductor terminal electrically configured to be electrically coupled to the voltage source and a second inductor terminal electrically coupled to the drain of the third MOSFET.

2. The power converter of claim 1, wherein the energy recovery circuit further comprises a first diode and a second diode each having a respective anode and cathode, wherein the anode of the first diode is electrically coupled to the first inductor terminal of the inductive element, and wherein the anode of the second diode is electrically coupled to the first inductor terminal of the second inductive element, and wherein the cathode of the second diode is electrically coupled to the cathode of the first diode.

3. The power converter of claim 2, wherein the energy recovery circuit comprises a capacitive element having a first capacitor terminal and a second capacitor terminal, wherein the first capacitor terminal of the capacitive element is electrically coupled to the cathode of the first diode and to the cathode of the second diode electrically coupled, and wherein the second capacitor terminal of the capacitive element is electrically coupled to a second inductor terminal of the first inductive element and the second inductor terminal of the second inductive element.

4. The power converter of claim 3, wherein the energy recovery circuit includes a recovery power converter having an input terminal and an output terminal, wherein the input terminal of the recovery power converter is electrically coupled to the cathode of the first diode, the cathode of the second diode, and first capacitor terminal of the capacitive element.

5. The power converter of claim 4, wherein the output terminal of the recovery power converter is electrically coupled to a second output load.

6. The power converter of claim 4, wherein the output terminal of the recovery power converter is electrically coupled to the voltage source.

7. The power converter of claim 4, wherein the output terminal of the recovery power converter is electrically coupled to the second capacitor terminal of the capacitive element, the first inductor terminal of the inductive element, and the second inductor terminal of the inductive element.

* * * * *